United States Patent [19]
Schiel

[11] Patent Number: 5,790,357
[45] Date of Patent: Aug. 4, 1998

[54] DIFFERENTIAL CURRENT PROTECTION FOR A TRANSFORMER

[75] Inventor: Ludwig Schiel, Berlin, Germany

[73] Assignee: Siemens Aktiengesellschaft, Munich, Germany

[21] Appl. No.: 732,420

[22] PCT Filed: Apr. 24, 1995

[86] PCT No.: PCT/DE95/00581

§ 371 Date: Jan. 2, 1997

§ 102(e) Date: Jan. 2, 1997

[87] PCT Pub. No.: WO95/30264

PCT Pub. Date: Nov. 9, 1995

[30] Foreign Application Priority Data

May 3, 1994 [DE] Germany ............... 44 16 048.8

[51] Int. Cl.$^6$ ............................................. H02H 7/04
[52] U.S. Cl. ............................. 361/36; 361/63; 361/93; 361/115
[58] Field of Search ........................ 361/115, 93, 63, 361/35, 36

[56] References Cited

U.S. PATENT DOCUMENTS

| | | | |
|---|---|---|---|
| 3,675,080 | 7/1972 | Bath | 361/93 |
| 5,172,329 | 12/1992 | Rahman et al. | 361/35 |
| 5,627,712 | 5/1997 | Wilkinson | 361/63 |

FOREIGN PATENT DOCUMENTS

| | | | |
|---|---|---|---|
| 2322981 | 11/1973 | Germany | H02H 3/28 |
| 4-26318 | 1/1992 | Japan | H02H 7/045 |

OTHER PUBLICATIONS

Clemens, et al., "Schutztechnik in Elektroenergiesystemen", 1991, pp. 224–227.

Lobos, et al., "Digitale Filteralgorithmen zur Echzeitermittlung der Grundschwingung von Spannungen, Stromen und Symmetrischer Komponenten", Elektrie, Berlin 46 (1992) 1, pp. 29–34.

Schiel, et al., "Umfassendes Konzept fur den Transformatorschutz", Schutztechnik, pp. 296–498 and 500–502.

Primary Examiner—Jeffrey A. Gaffin
Assistant Examiner—Stephen Jackson
Attorney, Agent, or Firm—Kenyon & Kenyon

[57] ABSTRACT

A differential current protective device for a transformer arranged in a multi-phase power supply system and having at least one star-connected winding arrangement with a grounded star point. The differential current protective device receives currents proportional to the system currents via current transformers provided on the high and low voltage sides of the transformer. A computing circuit of the protective device determines a differential phase-related current from the currents measured, taking into account a current parameter that corresponds to the zero system current based on the phase and whose intensity is monitored. The differential current protective device includes an auxiliary current transformer having its primary winding in the connection between the star point and ground. The computing circuit processes the secondary current of the auxiliary current transformer as the current parameter corresponding to the zero system current.

2 Claims, 2 Drawing Sheets

DIFFERENTIAL CURRENT PROTECTION FOR A TRANSFORMER

FIELD OF INVENTION

The present invention relates to a differential current protective device for a transformer in a multi-phase power supply system.

BACKGROUND INFORMATION

Power transformers such as those used in multi-phase power supply systems are wired differently on the high- and low-voltage sides with regard to their windings in individual applications. The different wiring of the windings is referred to as "vector groups" so each transformer has its own vector group. For example, the vector group of a transformer may be indicated as "Yd5" where "Y" denotes that the windings of the transformer are star connected on the high-voltage side, "d" indicates that the windings are delta connected on the low-voltage side and the number "5" indicates that the angle between conductor currents of a phase is 5×30°, i.e., 150°.

If a transformer in a multi-phase power supply system is to be monitored for internal faults by means of a differential current protective device, then for a comparison of the currents flowing on the high and low voltage sides, it is necessary to use current measurement parameters that are independent of how the windings of the transformer are wired, because otherwise differential current protective devices of different designs would have to be used for transformers having different vector groups. In comparing the currents on the two sides of the transformer to be monitored, the phase angle of the currents must also be taken into account. This matching of the differential current protective device to the vector group of the transformer to be monitored is known as vector group matching.

In vector group matching of a differential current protective device to a multi-phase transformer having a certain vector group, all the cases of faults that can occur must be taken into account, specifically so that the differential current protective device definitely will not respond when there is an external fault with respect to the transformer to be monitored, whereas a fault in the transformer to be monitored will definitely be indicated by the differential current protective device. A special problem in this regard arises when a differential current protective device is to monitor a transformer where at least one star winding has a grounded star point. With regard to such a transformer, an equation for calculating the asymmetrical components of the zero system current is provided for vector group matching for a state-of-the-art differential current protective device PQ 721 from AEG. With this device, the matching matrix shown below is used for the high voltage side of a transformer T having vector group Yd5 (see FIG. 1) for a transformer T to be monitored:

$$\begin{pmatrix} I^*_{L1os} \\ I^*_{L2os} \\ I^*_{L3os} \end{pmatrix} = \begin{pmatrix} 1 & 0 & 0 \\ 0 & 1 & 0 \\ 0 & 0 & 1 \end{pmatrix} \begin{pmatrix} I_{L1os} \\ I_{L2os} \\ I_{L3os} \end{pmatrix} - \begin{pmatrix} I_{0os} \\ I_{0os} \\ I_{0os} \end{pmatrix} \quad (1)$$

where $I_{L1os}$=measurable current in the phase or in conductor L1 on the high voltage side of the transformer to be monitored;

$I_{L2os}$=measurable current in the phase or in conductor L2 on the high voltage side of the transformer to be monitored;

$I_{L3os}$=measurable current in the phase or in conductor L3 on the high voltage side of the transformer to be monitored;

$I_{0os}$=zero system current on the high voltage side of the transformer to be monitored;

$I^*_{L1os}$="matched" current with respect to phase and conductor L1;

$I^*_{L2os}$="matched" current with respect to phase and conductor L2;

$I^*_{L3os}$="matched" current with respect to phase and conductor L3.

The matching matrix below is calculated for the low voltage side of the known device:

$$\begin{pmatrix} I^*_{L1us} \\ I^*_{L2us} \\ I^*_{L3us} \end{pmatrix} = 1/\sqrt{3} \begin{pmatrix} -1 & 0 & 1 \\ 1 & -1 & 0 \\ 0 & 1 & -1 \end{pmatrix} \begin{pmatrix} I_{L1us} \\ I_{L2us} \\ I_{L3us} \end{pmatrix} \quad (2)$$

The meaning of the individual parameters in matrix (2) is mostly the same as the nomenclature used in equation (1) except that the letter "u" is used in matrix (2) to indicate the low voltage side.

As mentioned before, the parameter $I_{0os}$ is determined in a computing circuit of the known device according to the following equation:

$$I_{0os} = \frac{1}{3}(I_{L1os} + I_{L2os} + I_{L3os}) \quad (3)$$

If an internal single-phase-to-ground fault occurs in phase L1 of transformer T that is to be monitored, then essentially the following fault condition (4) holds:

$$\begin{pmatrix} I_{L1os} \\ I_{L2os} \\ I_{L3os} \end{pmatrix} = \begin{pmatrix} 1 \\ 0 \\ 0 \end{pmatrix} \begin{pmatrix} I_F \\ I_F \\ I_F \end{pmatrix}, \quad (4)$$

where $I_F$ denotes a short-circuit current in phase L1.

Calculations show that differential currents $I_{DIFF1}$, $I_{DIFF2}$, and $I_{DIFF3}$ occur with respect to the individual phases or conductors L1 to L3 in the prior-art differential current protective device, as described by the following matrix (5):

$$\begin{pmatrix} I_{DIFF1} \\ I_{DIFF2} \\ I_{DIFF3} \end{pmatrix} = \begin{pmatrix} 2/3 \\ -1/3 \\ -1/3 \end{pmatrix} \begin{pmatrix} I_F \\ I_F \\ I_F \end{pmatrix} \quad (5)$$

This means that a differential current $I_{DIFF2}$ and $I_{DIFF3}$ is also detected with regard to the phases or conductors L2 and L3, although for the assumed fault case, no differential current should result for these lines or phases at all. This leads to a loss of sensitivity in detecting internal faults.

SUMMARY OF THE INVENTION

The present invention is directed to a differential current protective device for a transformer in a multi-phase power supply system having at least one star winding arrangement with a grounded star point that receives currents in phase-proportional secondary currents of the power supply system via current transformers arranged on the high and low voltage sides with respect to the transformer, where a differential phase-related current is formed from the secondary currents in a computing circuit, taking into account a current parameter that corresponds to the zero system current, and the size of the differential current is monitored. An object of the present invention is to provide a differential current protective device for a transformer that will be characterized by a high sensitivity even with a single-pole internal fault.

To achieve this object, the differential protective device according to this invention contains an auxiliary current transformer whose primary winding is in the connection between the star point and ground, and the computing circuit processes the secondary current of the auxiliary current transformer as the current parameter corresponding to the zero system current.

An important advantage of the differential current protective device according to the present invention consists of the fact that a matching matrix can be used merely due to the fact that an additional auxiliary current transformer is used and the current is detected between the star point and ground, and when there is a single-pole internal fault, this results in a differential current only with regard to the phase that actually has the fault. For the other (fault-free) phases, differential currents with a value of zero are determined.

With the differential current protective device according to the present invention, it has proven advantageous if the computing circuit takes into account ⅓ of the secondary current of the auxiliary current transformer as the parameter corresponding to the zero current.

DETAILED DESCRIPTION

Figure 1:
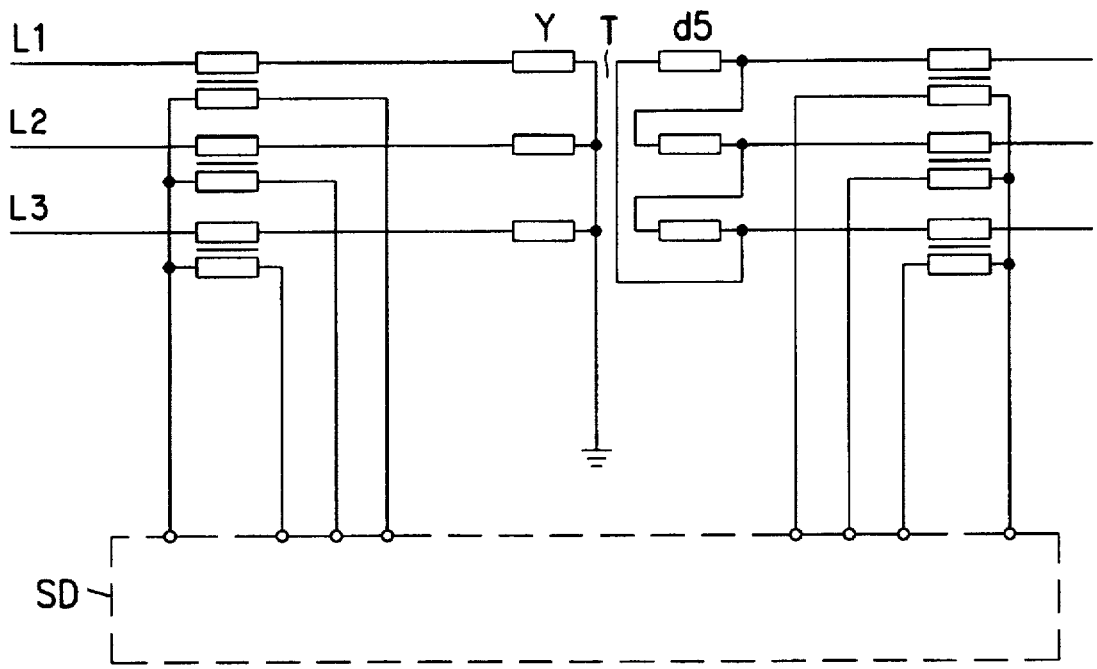
FIG. 1 illustrates a transformer circuit in a three-phase power system.
Figure 2:
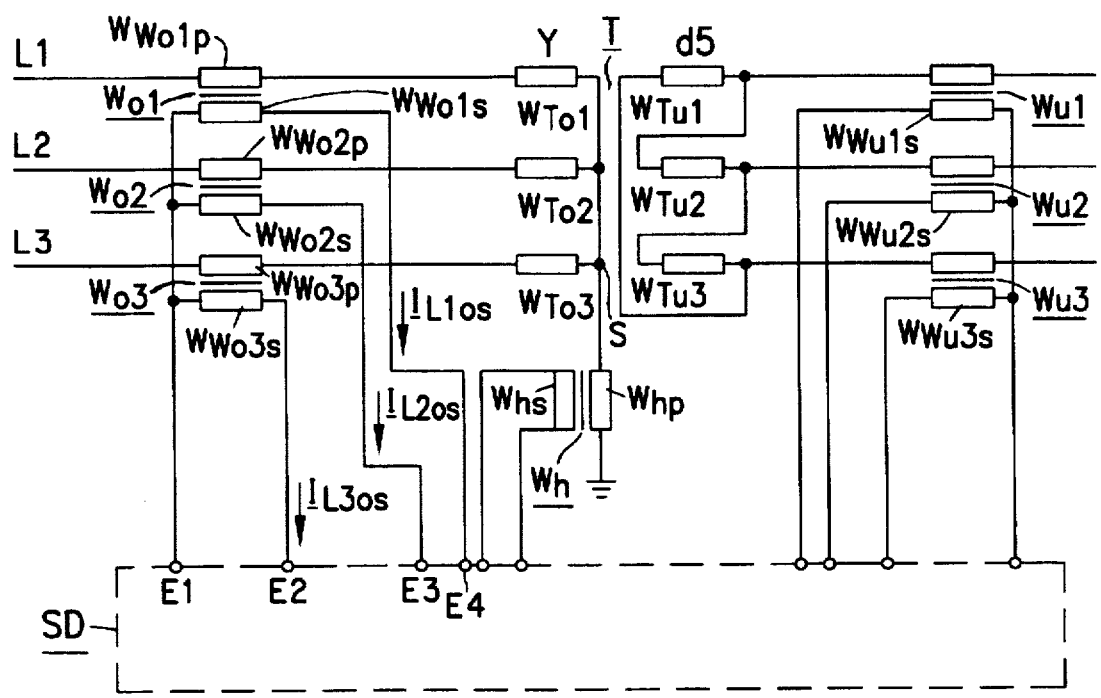
FIG. 2 shows an embodiment of a differential current protective device in accordance with the present invention.

As shown in detail in FIG. 2, where parts corresponding to those in FIG. 1 are shown with the same notation, the transformer T to be monitored is again arranged in a three-phase power supply network with conductors L1, L2 and L3, where the windings $W_{To1}$, $W_{To2}$, and $W_{To3}$ of transformer T are star connected on the high voltage side, which is also indicated by the letter "Y" in FIG. 2. The star point S of the winding arrangement with windings $W_{To1}$ to and $W_{To3}$ is connected to ground. On the low voltage side the windings $W_{Tu1}$, $W_{Tu2}$, and $W_{Tu3}$ are delta-connected ("d" in FIG. 2), where a phase shift between the currents by 5×30°, i.e., 150°, is indicated by the number 5.

Current transformers $W_{Wo1}$ to $W_{o3}$ with their primary windings $W_{o1p}$ to $W_{Wo3p}$ are arranged in line with conductors L1 to L3. Secondary windings $W_{Wo1s}$ to $W_{Wo3s}$ are connected to a differential current protective device SD at inputs $E_1$ to $E_4$ so that secondary currents $I_{L1os}$, $I_{L2os}$ and $I_{L3os}$ are supplied via these inputs. Similarly, current transformers $W_{u1}$ to $W_{u3}$ are provided on the low voltage side, and secondary currents $I_{L1us}$ to $I_{L3us}$ can be received by the differential current protective device SD via their secondary windings $W_{Wu1s}$ to $W_{Wu3s}$.

As FIG. 2 also shows, an auxiliary current transformer $W_h$ with its primary winding $W_{hp}$ is arranged in the connection between the star point S of the windings $W_{To1}$ to $W_{To3}$ of transformer T. The secondary winding $W_{hs}$ supplies the differential current protective device SD with a current that is proportional to the zero system current. In a computing circuit of the differential current protective device SD), a matching matrix such as that shown below is calculated for the high voltage side of the transformer T to be monitored:

$$\begin{pmatrix} I^*_{L1os} \\ I^*_{L2os} \\ I^*_{L3os} \end{pmatrix} = \begin{pmatrix} 1 & 0 & 1 \\ 0 & 1 & 0 \\ 0 & 0 & 1 \end{pmatrix} \begin{pmatrix} I_{L1os} \\ I_{L2os} \\ I_{L3os} \end{pmatrix} - \frac{1}{3} \begin{pmatrix} I_{Sm} \\ I_{Sm} \\ I_{Sm} \end{pmatrix} \quad (6)$$

The matching matrix for the low voltage side is exactly the same as that shown in equation (2) above for the prior-art device.

Figure 3:
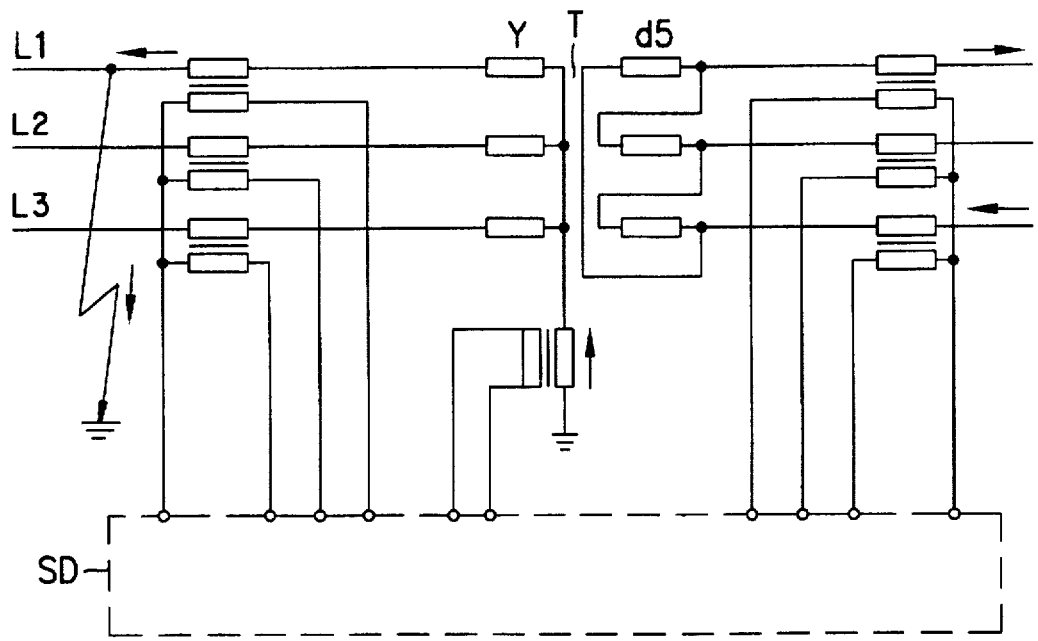
FIG. 3 shows the device of FIG. 2 being subjected to an external single-pole fault.

If a single-pole external fault such as that illustrated in FIG. 3 occurs with a differential current protective device according to this invention, this yields values such as those shown below for the currents with equation system (7):

$$I_{L1os} = 1\angle 0° \quad I_{Sm} = 1\angle 180° \quad I_{L1us} = 1/\sqrt{3}\ \angle 0° \quad (7)$$
$$I_{L2os} = 0 \quad\quad\quad\quad\quad\quad\quad\quad I_{L2us} = 0$$
$$I_{L3os} = 0 \quad\quad\quad\quad\quad\quad\quad\quad I_{L3us} = 1/\sqrt{3}\ \angle 180°$$

Further processing of these currents in differential current protective device SD takes place for the zero-phase current correction by means of equation (6) as shown above with regard to the high voltage side, and equation (2) is used for the vector group correction with regard to the low voltage side. This then yields the following values for the corrected or matched currents:

$$I^*_{L1os} = 2/3\angle 0° \quad\quad I^*_{L1us} = 2/3\angle 180° \quad (8)$$
$$I^*_{L2os} = 1/3\angle 180° \quad I^*_{L2us} = 1/3\angle 0°$$
$$I^*_{L3os} = 1/3\angle 180° \quad I^*_{L3us} = 1/3\angle 0°$$

The individual differential currents follow directly from this:

$$I_{DIFFL1} = I^*_{L1os} + I^*_{L1us} = 0$$
$$I_{DIFFL2} = I^*_{L2os} + I^*_{L2us} = 0$$
$$I_{DIFFL3} = I^*_{L3os} + I^*_{L3us} = 0 \quad (9)$$

Figure 4:
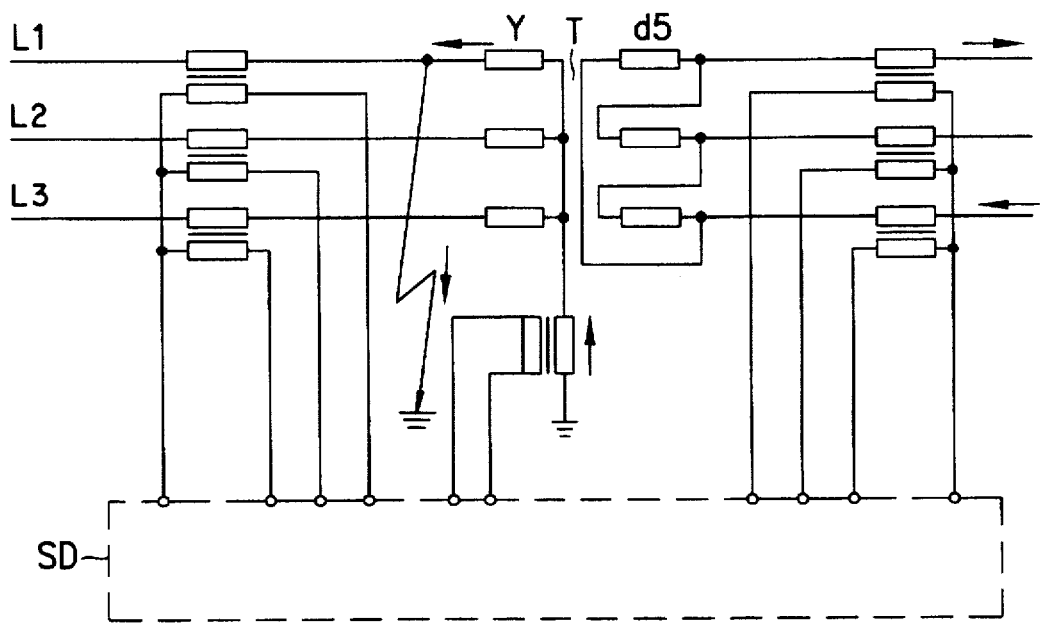
FIG. 4 shows the device of FIG. 2 being subjected to an internal single-pole fault.

However, if there is a single-pole internal fault, as illustrated in FIG. 4, this yields the following relationships with regard to the currents measured:

$$I_{L1os} = 0 \quad I_{Sm} = 1\angle 180° \quad I_{L1us} = 1/\sqrt{3}\ \angle 0° \quad (10)$$
$$I_{L2os} = 0 \quad\quad\quad\quad\quad\quad\quad I_{L2us} = 0$$
$$I_{L3os} = 0 \quad\quad\quad\quad\quad\quad\quad I_{L3us} = 1/\sqrt{3}\ \angle 180°$$

With regard to the corrected and "matched" currents, this then yields:

$$I^*_{L1os} = 1/3\angle 180° \quad I^*_{L1us} = 2/3\angle 180° \quad (11)$$
$$I^*_{L2os} = 1/3\angle 180° \quad I^*_{L2us} = 1/3\angle 0°$$
$$I^*_{L3os} = 1/3\angle 180° \quad I^*_{L3us} = 1/3\angle 0°$$

With regard to the differential currents $I_{DIFFL1}$ to $I_{DIFFL3}$ the following values are obtained:

$$I_{DIFFL1} = I^*_{L1os} + I^*_{L1us} = 1\angle 180°$$
$$I_{DIFFL2} = I^*_{L2os} + I^*_{L2us} = 0$$
$$I_{DIFFL3} = I^*_{L3os} + I^*_{L3us} = 0 \quad (12)$$

This shows that with a differential current protective device of the design according to the present invention, the sensitivity of the protective device is not limited even with a single-pole internal fault.

In conclusion, it should be pointed out explicitly that the use of the present invention is not limited to a transformer with the vector group illustrated in the figures, but instead it can also be used to advantage in monitoring all such transformers where at least one winding arrangement on the high or low voltage side has star-connected windings with a grounded star point. This is especially true of transformers to be monitored that have star-connected windings on the low voltage side with a grounded star point and also, for example, transformers that have windings with a grounded star point on both the high and low voltage sides. The correction of the zero system current in the manner according to the present invention should always be performed in cases where winding arrangements have star-connected windings with a grounded star point.

What is claimed is:

1. A differential current protective device for a transformer in a multi-phase power system, the transformer having low and high voltage sides and a star-connected winding arrangement with a grounded star point, the device comprising:

a first plurality of current transformers arranged on the low voltage side of the transformer, each of the current transformers having a primary winding in series with a phase of the power system;

a second plurality of current transformers arranged on the high voltage side of the transformer, each of the current transformers having a primary winding in series with a phase of the power system;

means for receiving currents in secondary windings of the first and second pluralities of current transformers;

an auxiliary current transformer having a primary winding connected between the star point and ground and a secondary winding which generates a current corresponding to a zero system current; and a computing circuit for forming a differential current for each phase of the multi-phase power system, the differential currents being formed in dependance on the currents in the secondary windings of the current transformers and on the current in the secondary winding of the auxiliary current transformer.

2. The differential current protective device of claim 1, wherein the computing circuit uses ⅓ of the secondary current of the auxiliary current transformer as the current corresponding to the zero system current.

* * * * *